United States Patent
Oza

(10) Patent No.: US 9,740,501 B2
(45) Date of Patent: *Aug. 22, 2017

(54) GENERATING AND AUTOMATICALLY LOADING REDUCED OPERATING SYSTEM BASED ON USAGE PATTERN OF APPLICATIONS

(71) Applicant: Novell, Inc., Provo, UT (US)

(72) Inventor: Dhairesh Oza, Hubli (IN)

(73) Assignee: Novell, Inc., Provo, UT (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/310,040

(22) Filed: Jun. 20, 2014

(65) Prior Publication Data

US 2014/0304705 A1    Oct. 9, 2014

Related U.S. Application Data

(63) Continuation of application No. 12/508,717, filed on Jul. 24, 2009, now Pat. No. 8,769,529.

(51) Int. Cl.
    *G06F 9/455* (2006.01)
    *G06F 9/44* (2006.01)
    *G06F 9/445* (2006.01)

(52) U.S. Cl.
    CPC .......... *G06F 9/4406* (2013.01); *G06F 8/63* (2013.01); *G06F 9/45533* (2013.01); *G06F 9/45558* (2013.01)

(58) Field of Classification Search
    CPC ...... G06F 9/4406; G06F 8/63; G06F 9/45533; G06F 9/45558
    See application file for complete search history.

(56) References Cited

U.S. PATENT DOCUMENTS

| | | |
|---|---|---|
| 5,949,415 A | 9/1999 | Lin et al. |
| 6,138,271 A | 10/2000 | Keeley |
| 6,219,721 B1 | 4/2001 | Su |
| 6,594,786 B1 | 7/2003 | Connelly et al. |
| 6,993,642 B2 | 1/2006 | Burkhardt et al. |
| 8,769,529 B2 | 7/2014 | Oza |
| 2006/0031547 A1 | 2/2006 | Tsui et al. |

(Continued)

OTHER PUBLICATIONS

Gauthier, L., et al., "Automatic generation and targeting of application-specific operating systems and embedded systems software", IEEE Transactions on Computer-Aided Design of Integrated Circuits and Systems, 20(11), (Nov. 2001), 1293-1301.

*Primary Examiner* — James J Lee
(74) *Attorney, Agent, or Firm* — Schwegman Lundberg & Woessner, P.A.

(57) ABSTRACT

Apparatus, systems, and methods may operate to monitor operations of at least one processor to define a set of executed applications executed under a first operating system over a selected time period; and to generate an image of a second operating system having sufficient resources to service a subset of the set of executed applications, the subset determined according to a usage pattern defined by at least a portion of the selected time period, the number of resources provided by the second operating system being less than or equal to the number of resources provided by the first operating system. The images may be loaded based on receipt of a menu selection. Additional apparatus, systems, and methods are disclosed.

18 Claims, 4 Drawing Sheets

(56) References Cited

U.S. PATENT DOCUMENTS

| | | | |
|---|---|---|---|
| 2006/0116981 A1* | 6/2006 | Krimmel | G06F 11/3476 |
| 2006/0156209 A1* | 7/2006 | Matsuura | G06Q 10/10 |
| | | | 714/798 |
| 2007/0143452 A1 | 6/2007 | Suenbuel et al. | |
| 2007/0150589 A1* | 6/2007 | Kim | G06F 8/60 |
| | | | 709/224 |
| 2007/0232290 A1* | 10/2007 | Tatman | H04W 24/00 |
| | | | 455/423 |
| 2008/0147731 A1* | 6/2008 | Narayana | G06Q 30/02 |
| 2008/0165714 A1* | 7/2008 | Dettinger | H04W 52/0261 |
| | | | 370/311 |
| 2009/0089569 A1 | 4/2009 | Baribault et al. | |
| 2009/0172662 A1 | 7/2009 | Liu et al. | |
| 2009/0293121 A1* | 11/2009 | Bigus | G06F 21/316 |
| | | | 726/22 |
| 2010/0017801 A1* | 1/2010 | Kundapur | G06F 9/45558 |
| | | | 718/1 |
| 2010/0042704 A1* | 2/2010 | Chakra | G06Q 10/109 |
| | | | 709/221 |
| 2010/0125657 A1 | 5/2010 | Dowling et al. | |
| 2010/0231383 A1* | 9/2010 | Levine | H04W 52/0261 |
| | | | 340/540 |
| 2010/0235823 A1 | 9/2010 | Garbers et al. | |
| 2010/0271956 A1 | 10/2010 | Diwakar et al. | |
| 2010/0325261 A1* | 12/2010 | Radhakrishnan | G06F 15/173 |
| | | | 709/224 |
| 2011/0010222 A1* | 1/2011 | Choudhary | G06Q 10/06 |
| | | | 705/7.37 |
| 2011/0023026 A1 | 1/2011 | Oza | |

\* cited by examiner

GENERATING AND AUTOMATICALLY LOADING REDUCED OPERATING SYSTEM BASED ON USAGE PATTERN OF APPLICATIONS

This application is a continuation of U.S. patent application Ser. No. 12/508,717, filed on Jul. 24, 2009, which is incorporated herein by reference in its entirety.

BACKGROUND

The size of an operating system (OS) is often proportional to the number of applications supported, and the resources it provides. Thus, to accommodate a growing number of applications, and to provide a greater number of resources to a broad audience of users, the average size of an OS has grown over time. As the size of the OS increases, the time taken to boot a system that uses the OS, as well as the memory occupied by the OS and its operations, tends to increase as well. This can lead to decreased consumer satisfaction.

SUMMARY

In various embodiments, apparatus, systems, and methods that support pattern-based OS configuration and use are provided. For example, in some embodiments, OS configuration is accomplished by monitoring the operations of at least one processor to define a set of executed applications executed under a first OS over a selected time period. An image of a second OS having sufficient resources to service a subset of the set of executed applications can then be generated, with the subset determined according to a usage pattern defined by at least a portion of the selected time period. In many instances, the number of resources provided by the second OS are less than or equal to the number of resources provided by the first OS. OS images may be loaded based on receipt of a menu selection. Additional embodiments are described, and along with the foregoing examples, will be set forth in detail below.

DETAILED DESCRIPTION

Figure 1:
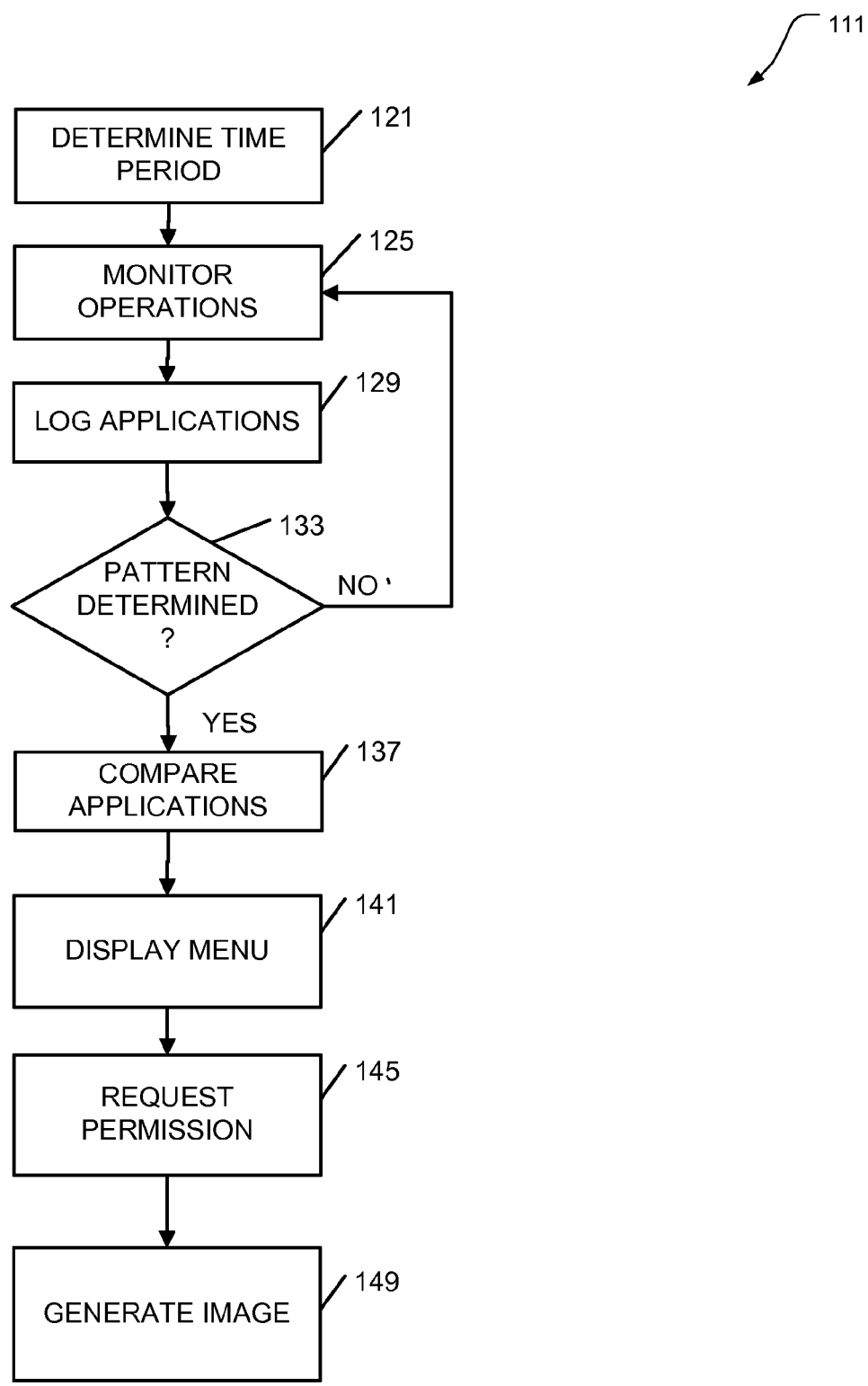
FIG. 1 is a flow diagram illustrating methods of pattern-based OS configuration according to various embodiments of the invention.

Many computer users operate according to a daily routine. For example, some use their laptop computer to browse the Internet in the morning, to play music during meals, and to check email messages in the evening. During the day, work activity with the same computer may include the use of a word processor, a spreadsheet program, and email messaging. Taken together, over time, this use can be recognized as making up a pattern.

To afford increased efficiency, the extent of the resources provided by an OS loaded during any particular time period may be determined by previously-established use patterns. For example, a reduced version of the complete OS can be built to serve the needs of a particular set of applications whose use is anticipated during designated times of the day. Adjusting the size of an OS to provide a reduced number of resources is known to those of ordinary skill in the art. For example, such activity is supported by the Novell® SUSE™ Appliance Program, among others.

In various embodiments, an application can be executed on a computer to monitor patterns of use for that computer or another computer. OS images suited to the usage patterns that are discerned by the application can be created, and then loaded on the monitored computer for use according to the anticipated patterns of use. Such images can be recorded on a local hard disk, installed within separate memory partitions, installed on memory sticks, and/or burned on removable disks (e.g., CD-ROMS) to enhance the user experience.

In some embodiments, a daemon running as a superuser can hook into the regular (full-size) OS to make a list of applications that are executed by a particular processor. The daemon can populate a database with the identity of the applications, and the time of day in which they are used. When the amount of data in the database reaches a selected volume (e.g., when operations have been monitored for a day, a week, or a month; or when a selected number of applications have been used; or when one application has been initiated a selected number of times, etc.), or when initiated by a user, a system administrator, or a policy, another process can be executed to identify patterns of use based on times of use and the applications executed at those times. Once the usage patterns are identified, an option can be provided to create an OS that provides only the resources needed by those applications, along with some basic set of resources, if desired.

For example, the database for a hypothetical user might appear as shown in Table I:

TABLE I

|  | DAY 1 | DAY 2 | DAY 3 | ... | DAY 10 | ... | DAY 30 | TOTAL |
|---|---|---|---|---|---|---|---|---|
| 7-8 am | BR, MP | BR, MP, MC | BR, MP | ... | BR, MP | ... | BR, MP | BR = 30 days; MP = 28 days, MC = 3 days |
| 8-9 am | MC, WD | MC, WD | MC, WD, SS | ... | MC, WD | ... | MC, WD, SS | MC = 30 days; WD = 29 days; SS = 5 days |
| ... | ... | ... | ... | ... | ... | ... | ... | ... |
| 4-5 pm | MC, WD | MC, WD | MC, WD, SS | ... | MC, WD | ... | MC, WD, SS | MC = 29 days; WD = 30 days; SS = 10 days |
| 5-6 pm | BR, MP | BR, MP, MC | BR, MP | ... | BR, MP | ... | BR, MP | BR = 28 days; MP = 25 days, MC = 3 days |

BR = browser,
MC = mail client,
MP = music player,
SS = spreadsheet,
WD = word processor Patterns can be determined by setting a lower use threshold against which actual use is compared, perhaps tailored for each application. For example, it may be specified that a browser application must be used at least ten times during the monitoring period to prompt OS feature support for the browser, whereas a word processor may only need to be used twice to overcome the lower use threshold for that application, before prompting the imaged OS to provide support for the word processor as well.

Thus, in the example provided by Table I, the database illustrates a catalog that lists applications that have been used over an entire month, along with the number of times the applications are used during particular times of the day. According to an established policy, an OS image for each hour, or for off-work and working hours, or for weekdays and weekends, can be generated. Of course, other selections can also be made, such as using one version for the morning hours, and another for the afternoon.

In some embodiments, the catalog can be displayed to the user or an administrator as part of a menu, and a selection of applications to be supported at specific times, or by a specific OS image, can be received to use in generating one or more appropriate (reduced size) OS images. Once the images have been generated, they can be loaded manually or automatically according to the time of day, or day of the week, etc.

In some embodiments, the boot loader for the computer can operate to display, based on the time of day, which version of an OS should be loaded (as a user/administrator option), or which version will be automatically loaded—to alert the user to the resources that may, or may not be available over the time period that follows. In some embodiments, the boot loader may operate to boot up a hypervisor, which in turn operates to execute the OS image that is selected, either by the user/administrator, or automatically.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of pattern-based OS configuration according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, pattern-based OS configuration is now discussed with reference to FIG. 1.

In some embodiments, a processor-implemented method 111 that can be executed on one or more processors that perform the method may operate to generate an OS image that is reduced in size and/or the amount of resources provided/consumed by monitoring execution activity under a first (regular, non-reduced) OS for some fixed period of time and configuring a second (reduced) OS based on a pattern defined by the monitoring. Thus, the method 111 may begin at block 121 with determining a time period that has been selected for monitoring. The time period for monitoring can be selected by a user, a system administrator, or by a (default) policy value, among other ways. The method 111 may continue on to block 125 to include monitoring operations of at least one processor to define a set of executed applications executed under a first OS over the selected time period.

Configuration of the reduced OS may account for libraries that are accessed during the monitoring time period. Thus, the activity at block 125 may comprise monitoring library access over the selected time period.

A super-user running as a daemon can be used to conduct the monitoring operations. Thus, the activity at block 125 may also comprise running a daemon as a super-user.

One machine can (remotely) monitor the operations of a processor in another machine to configure the reduced OS. A machine can also operate to (directly) monitor the operations of one or more of its own processors. Thus, in some embodiments, the activity at block 125 may comprise monitoring the operations remotely. In others, the activity at block 125 may comprise monitoring the operations directly.

The set of applications that have been executed during the monitoring time period can be logged to a database for later analysis. Thus, the method 111 may go on to block 129 to include logging the set of executed applications to a database.

The method 111 may include, at block 133, determining the usage pattern by comparing a lower threshold of use against actual use of some of the set of executed applications. Examples of this activity have been provided previously. Other mechanisms are available to determine usage patterns as well. If insufficient activity is present to determine a pattern of usage, then the method 111 may include further monitoring at block 125.

Once a pattern of use has been determined at block 133, the method 111 may continue on to block 137. Here, the subset of applications used to configure the OS may be limited to those applications which have been approved by a system administrator, or a policy. Thus, the activity at block 137 may comprise determining a subset (of the set of applications executed during the monitoring period), at least in part, by comparing a set of permitted applications against the set of applications that have been executed during the monitoring period. In some embodiments, this restriction is imposed prior to determining the usage pattern.

The user, an administrator, or a policy can operate to set up OS configuration to support a subset of applications defined by the pattern of use. In some embodiments, the OS image is configured to support the subset and one or more applications that were not used during the monitoring period but are nevertheless deemed useful (e.g., an emergency communications package). Thus, the method 111 may include, at block 141, displaying a menu of at least one of the set of applications executed during the monitoring period, or a subset of the applications executed (during the monitoring period) on a display. The method 111 may go on to block 145 to include requesting permission to generate the image of the OS based on a subset of the applications that have been executed, or the subset of applications and/or at least one additional (e.g., emergency access) application.

The method 111 may go on to block 149 to include generating an image of the second OS having sufficient resources to service a subset of the set of executed applications, the subset determined according to a usage pattern defined by at least a portion of the selected time period. In most cases, the number of the resources provided by the second (reduced) OS are less than or equal to the number of the resources provided by the first (regular, non-reduced) OS.

Images can be generated in a virtual machine format, to support downloading the image from a server to a client, perhaps under control of a hypervisor. Thus, the activity at block 149 may comprise generating the image in a virtual machine format.

The OS image can be generated remotely, or on the same computer at which the monitored operations occur. Thus, in some embodiments, the activity at block 149 comprises generating the image at a node that does not include the at least one processor (i.e., the image is generated at a different node than the monitored node). Other embodiments may be realized.

Figure 2:
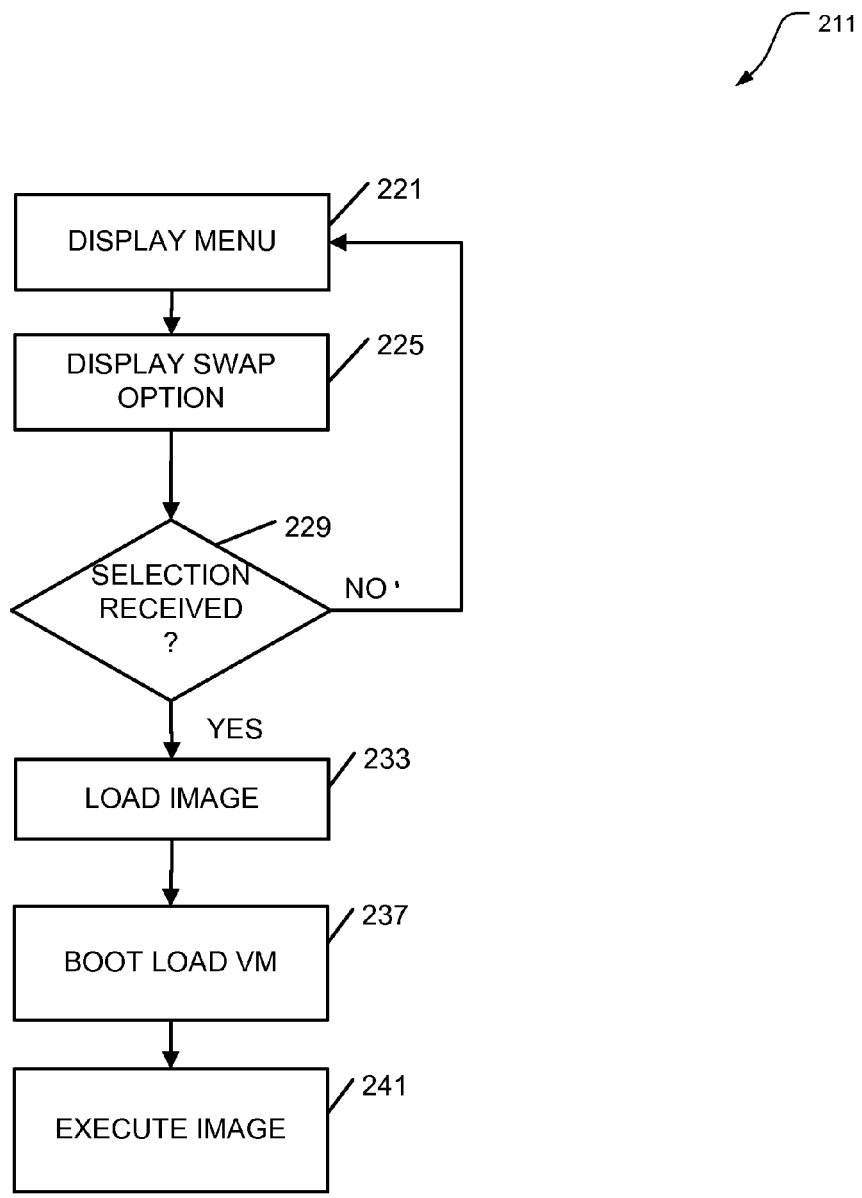
FIG. 2 is a flow diagram illustrating methods of pattern-based OS implementation according to various embodiments of the invention.

For example, FIG. 2 is a flow diagram illustrating methods 211 of pattern-based operating system implementation according to various embodiments of the invention. In this case, the methods 211 focus on how alternative OS images can be selected and used. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may comprise offering a menu of OS choices, and loading the image of the selected OS. The method 211 may begin at block 221 with displaying a menu on a display, the menu offering a first (base or non-reduced) OS and a second (reduced) OS providing a number of resources less than or equal to the number provided by the first OS. The second OS, although reduced, provides sufficient resources to service a subset of applications supported by the first OS, wherein the subset is determined according to a usage pattern associated with the applications and defined by a monitoring time period.

The method 211 may operate between a client and server, where the client operates to download a selected OS from the server, based on an OS selection received at the server. Thus, the activity at block 221 may comprise displaying the menu at a client machine.

The user, a system administrator, or a policy may permit OS swapping based on time, according to the usage pattern. Thus, in some embodiments, the method 211 may include, at block 225, displaying the option of scheduled swapping between the first OS and the second OS based on the usage pattern.

If a menu selection is not received, as determined at block 229, the method 211 may include returning to block 221, to continue displaying a menu of available OS selections. If the OS menu selection is received, as determined at block 229, the method 211 may continue on to block 233 with loading an image of one of the first OS or the second OS according to the selection. Additional OS images may be displayed and selected.

In some embodiments, the OS image can be loaded as a virtual image in a virtual machine environment. Thus, the activity at block 233 may include loading the image as a virtual image.

The image can be automatically loaded based on time. For example, the time of day, a day of the week, or a calendar date, among others. Thus, the activity at block 233 may include loading the image based on the time of day, day of the week, or a date.

In some embodiments, a hypervisor can be used to control the OS use operations. Thus, the method 211 may include, at block 237, boot loading a virtual machine from a hypervisor. The method 211 may continue on to block 241 with initiating execution of the image using the hypervisor after loading the virtual machine.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of pattern-based operating system configuration and use shown in FIGS. 1 and 2 can be implemented in various devices, as well as in a computer-readable storage medium, where the methods are adapted to be executed by one or more processors. Further details of such embodiments will now be described.

Figure 3:
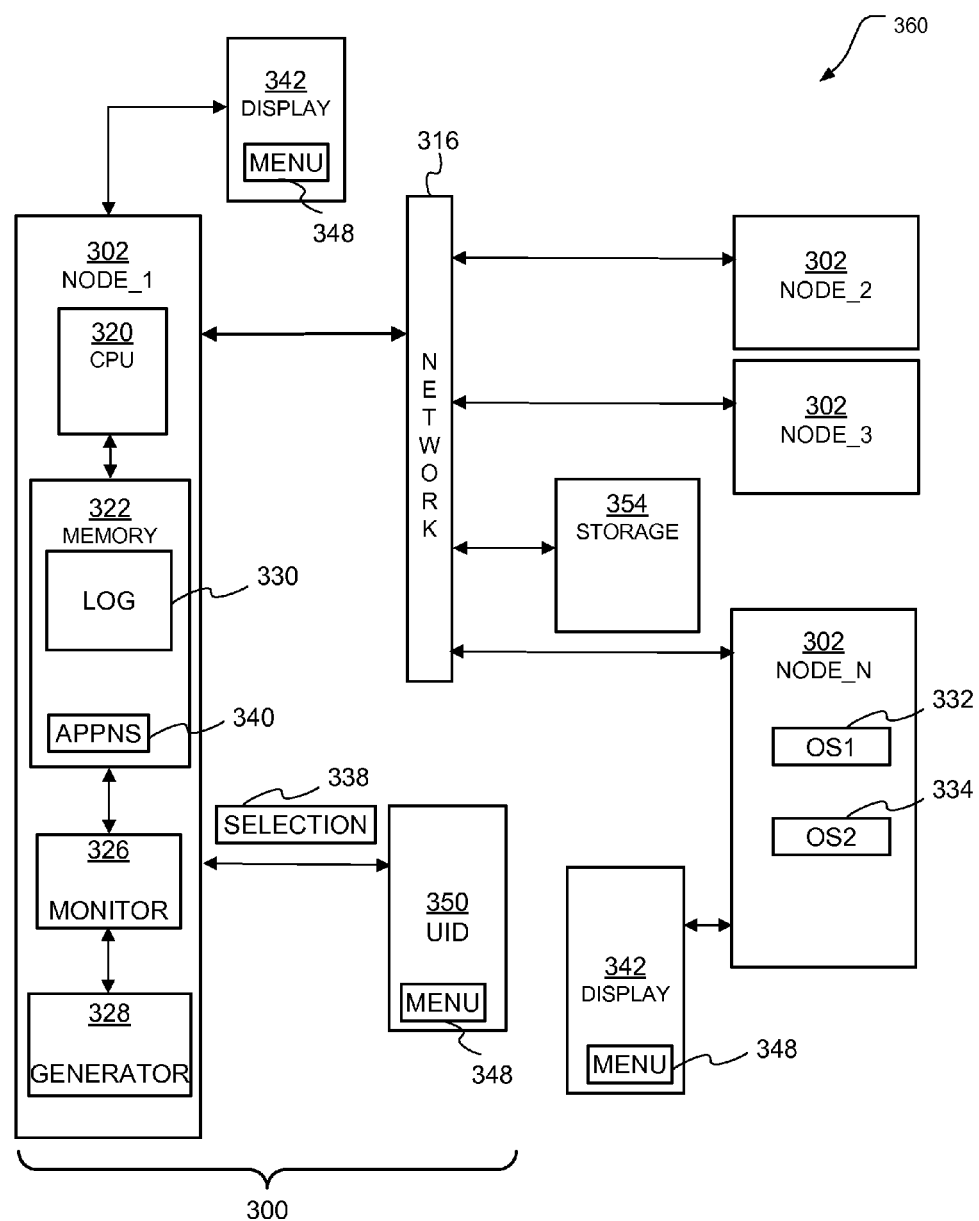
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement pattern-based operating system configuration and use may comprise one or more processing nodes 302, one or more processors 320, memory 322, a monitoring module 326, a generating processor 328, and a display 342. The apparatus 300 may comprise a client, or some other networked processing node.

The processing nodes 302 may comprise physical machines or virtual machines, or a mixture of both. The nodes 302 may also comprise networked entities, such servers and/or clients. In some basic implementations, the operations described can occur entirely within a single node 302.

In some embodiments, then, an apparatus 300 may comprise a node 302 (e.g., NODE_1) including a monitoring module 326 to monitor operations of at least one processor (e.g., processor 320) to define a set of executed applications 340 executed under a first OS 332 over a selected time period.

The apparatus 300 may further comprise a generating processor 328 included in the node 302 to generate an image of a second OS 334 having sufficient resources to service a subset of the set of executed applications 340, the subset determined according to a usage pattern defined by at least a portion of the selected time period. In most cases, the number of the resources provided by the second OS 334 are less than or equal to the number of the resources provided by the first OS 332.

The monitored applications 340 can be logged. Thus, the apparatus 300 may include a memory 322 coupled to the node 302 to store a log 330 of the set of executed applications 340.

Users and/or system administrators can select which OS they would like to use at boot time, or some other time, perhaps based on anticipated application use. Thus, the apparatus 300 may further comprise a display 342 coupled to the node 302 to indicate that a selected application is or is not supported by the second OS 334.

A user input device 350, such as a keyboard, touch screen, trackball, switch, photosensitive device, imager, microphone, mouse, etc. may be used to provide the selection input 338 (e.g., which of the images has been selected for loading). Thus, the apparatus 300 may comprise a user input device 350 to provide the selection input 338. Still further embodiments may be realized.

For example, it can be seen that a system 360 that operates to implement pattern-based operating system configuration and use may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_N.

In some embodiments then, a system 360 can operate using multiple nodes: one node (e.g., NODE_1) to monitor operations, and another node (e.g., NODE_N) to generate one or more OS images OS1, OS2, etc. based on the determined usage pattern. The monitored operations may occur in yet another node, completely apart from the monitoring and generating nodes, in some embodiments. Thus, the processor for which operations are monitored may be located in a third node (e.g., either one or both of nodes NODE_2, NODE_3).

Thus, in some embodiments, a system 360 comprises a first node (e.g., NODE_1) including a monitoring module 326 to monitor operations of at least one processor (e.g., processor 320 in NODE_1, and/or processors in NODE_2, NODE_3) to define a set of executed applications 340 executed under a first OS 332 over a selected time period. The system 360 may further comprise a second node (e.g., NODE_N) including a generating processor 328 to generate an image of a second OS 334 having sufficient resources to service a subset of the set of executed applications 340, the subset determined according to a usage pattern defined by at least a portion of the selected time period.

Users can be prompted to choose between the regular OS, and a reduced OS customized to their usage habits. Thus, the system 360 may also comprise one or more displays 342 coupled to one of the nodes 302 to display a menu 348 offering a choice of selecting between loading the first OS 332 and the second OS 334.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
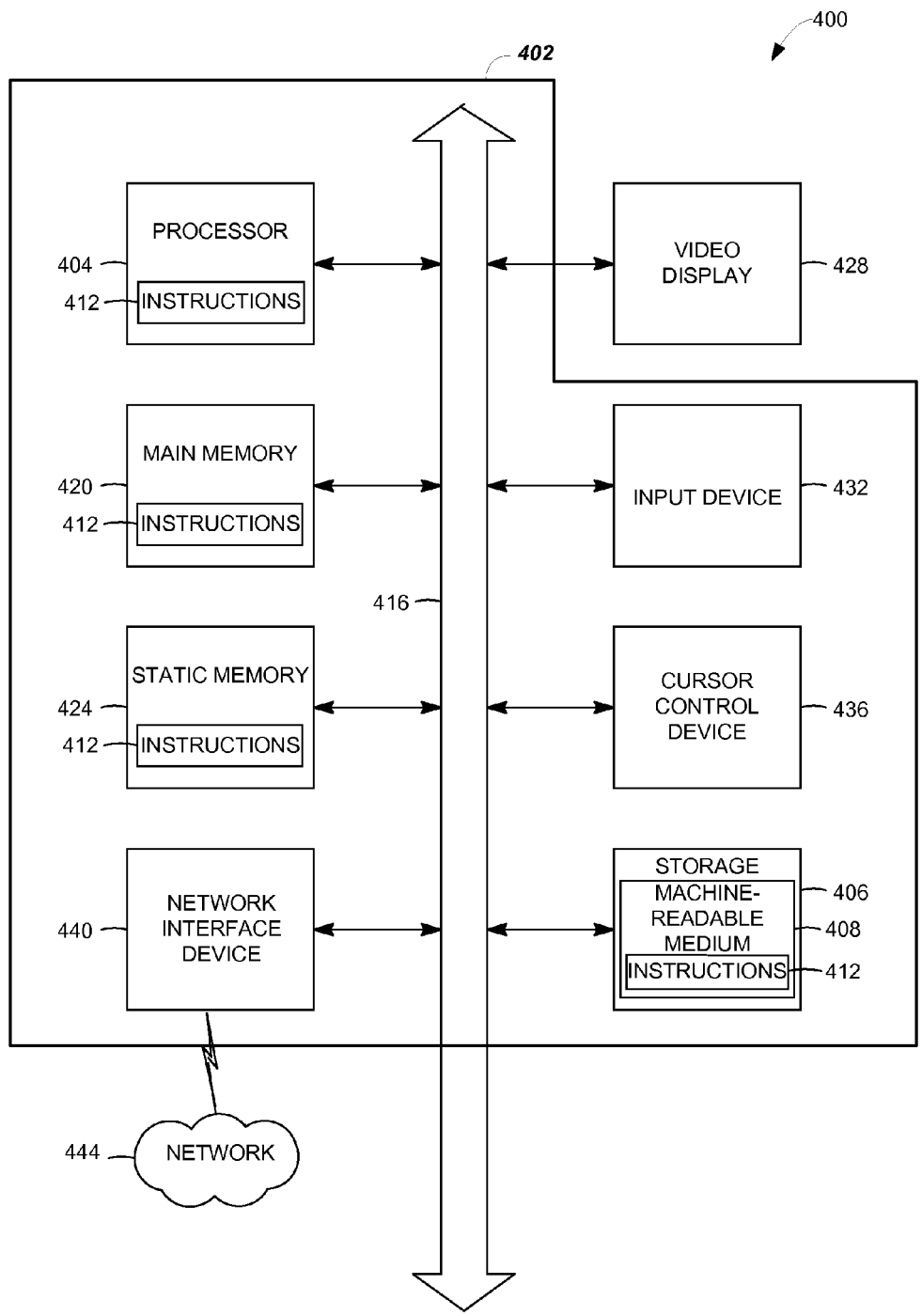
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make application access more efficient, providing higher performance and a simplified desktop experience. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for providing pattern-based operating system comprising:
    generating a reduced operating system (OS) image, by a first processor, based on a monitored usage pattern of applications executing under a full OS, the monitored usage pattern including resource usage of the executed applications during a selected time period, the reduced OS image having sufficient resources to service a subset of the executed applications and at least capable of satisfying the respective resource usage, the subset comprising one or more applications from the executed applications having the respective resource usage exceed a threshold during the selected time period, the selected time period being a recurring time period including at least one of a time of day, a day of a week, and a calendar date; and
    automatically loading, by a second processor, the reduced OS image when a current time period matches the selected time period.

2. The method of claim 1, comprising generating a second reduced OS image based on the monitored usage pattern of the executed applications during a second selected time period; and
    automatically loading, by the second processor, the second reduced OS image when a subsequent current time period matches the second selected time period, the subsequent current time period starting after the current time period.

3. The method of claim 1, wherein the monitored usage pattern of the executed applications is an observed pattern of the resource usage behavior by the executed applications on a computer system over time.

4. The method of claim 3, wherein the monitored usage pattern of the executed applications is specific to a user of the computer system.

5. The method of claim 3, comprising generating the monitored usage pattern of the executed applications by monitoring resource use with respect to time on the computer system.

6. The method of claim 1, wherein automatically loading the reduced OS image includes a hypervisor loading the reduced OS image onto a virtual machine.

7. A machine-readable medium that is not a transitory propagating signal, the machine readable medium including instructions that, when executed by a machine, cause the machine to perform operations for providing pattern-based operating system comprising:
    generating a reduced operating system (OS) image, by a first processor, based on a monitored usage pattern of applications executing under a full OS, the monitored usage pattern including resource usage of the executed applications during a selected time period, the reduced OS image having sufficient resources to service a subset of the executed applications and at least capable of satisfying the respective resource usage, the subset comprising one or more applications from the executed applications having the respective resource usage exceed a threshold during the selected time period, the selected time period being a recurring time period including at least one of a time of day, a day of a week, and a calendar date; and
    automatically loading, by a second processor, the reduced OS image when a current time period matches the selected time period.

8. The machine-readable medium of claim 7, comprising generating a second reduced OS image based on the monitored usage pattern of the executed applications during a second selected time period; and
    automatically loading, by the second processor, the second reduced OS image when a subsequent current time period matches the second selected time period, the subsequent current time period starting after the current time period.

9. The machine-readable medium of claim 7, wherein the monitored usage pattern of the executed applications is an observed pattern of the resource usage by the executed applications on a computer system over time.

10. The machine-readable medium of claim 9, wherein the monitored usage pattern of the executed applications is specific to a user of the computer system.

11. The machine-readable medium of claim 9, comprising generating the monitored usage pattern of the executed applications by monitoring resource use with respect to time on the computer system.

12. The machine-readable medium of claim 7, wherein automatically loading the reduced OS image includes a hypervisor loading the reduced OS image onto a virtual machine.

13. A system for providing pattern-based operating system comprising:

a first node including a first processor to:

generate a reduced operating system (OS) image based on a monitored usage pattern of applications executing under a full OS, the monitored usage pattern including resource usage of the executed applications during a selected time period, the reduced OS image having sufficient resources to service a subset of the executed applications and at least capable of satisfying the respective resource usage, the subset comprising one or more applications from the executed applications having the respective resource usage exceed a threshold during the selected time period, the selected time period being a recurring time period including at least one of a time of day, a day of a week, and a calendar date; and a second node including a second processor to:

automatically load the reduced OS image when a current time period matches the selected time period.

14. The system of claim 13, wherein the first node is to:

generate a second reduced OS image based on the monitored usage pattern of executed applications during a second selected time period; and wherein the second node is to:

automatically load the second reduced OS image when a subsequent current time period matches the second selected time period, the subsequent current time period starting after the current time period.

15. The system of claim 13, wherein the monitored usage pattern of the executed applications is an observed pattern of the resource usage by the executed applications on a computer system over time.

16. The system of claim 15, wherein the monitored usage pattern of the executed applications is specific to a user of the computer system.

17. The system of claim 15, wherein the second node comprises a monitoring module to generate the monitored usage pattern of the executed applications by monitoring resource use with respect to time on the computer system.

18. The system of claim 13, wherein to automatically load the reduced OS image includes the second node having a hypervisor to load the reduced OS image onto a virtual machine of the first node.

* * * * *